United States Patent [19]
Anderson et al.

[11] Patent Number: 5,459,825
[45] Date of Patent: Oct. 17, 1995

[54] SYSTEM FOR UPDATING THE LOCATIONS OF OBJECTS IN COMPUTER DISPLAYS UPON RECONFIGURATION

[75] Inventors: Greg Anderson, Soquel; Ian Hendry; Konstantin Othmer, both of San Jose, all of Calif.

[73] Assignee: Apple Computer, Inc., Cupertino, Calif.

[21] Appl. No.: 209,276

[22] Filed: Mar. 14, 1994

[51] Int. Cl.⁶ ..................................... G06T 3/00
[52] U.S. Cl. .................. 395/133; 395/138; 395/139; 395/145; 395/157
[58] Field of Search ..................... 395/133, 136, 395/138, 139, 145–149, 153, 155, 157, 158, 159, 160, 161; 345/119, 120, 121, 126, 127, 131, 132, 133

[56] References Cited

U.S. PATENT DOCUMENTS

| | | | |
|---|---|---|---|
| 4,855,728 | 8/1989 | Mano et al. | 340/805 |
| 4,860,246 | 8/1989 | Inoue | 364/DIG. 2 |
| 4,926,166 | 5/1990 | Fujisawa et al. | 340/717 |
| 4,980,678 | 12/1990 | Zenda | 340/716 |
| 4,990,904 | 2/1991 | Zenda | 382/47 X |
| 5,159,683 | 10/1992 | Lvovsky et al. | 395/100 |

*Primary Examiner*—Almis R. Jankus
*Attorney, Agent, or Firm*—Burns, Doane, Swecker & Mathis

[57] ABSTRACT

A system for updating the location of elements in a computer display, upon a change in the size and/or configuration of the display, maintains user preferences regarding the appearance of elements. As a first step, user designated locations for individual elements, such as icons, are stored in a database for each different display configuration. Upon changing the display from one configuration to another, the elements are positioned in accordance with the information stored in the database. In a second aspect of the system, each of the original and new displays are divided into corresponding sectors. All objects located within a sector of the original display are placed in the same position in the corresponding sector of the new display. With this system, the groupings of objects and overall display appearance are maintained upon changing from one display configuration to another.

25 Claims, 4 Drawing Sheets

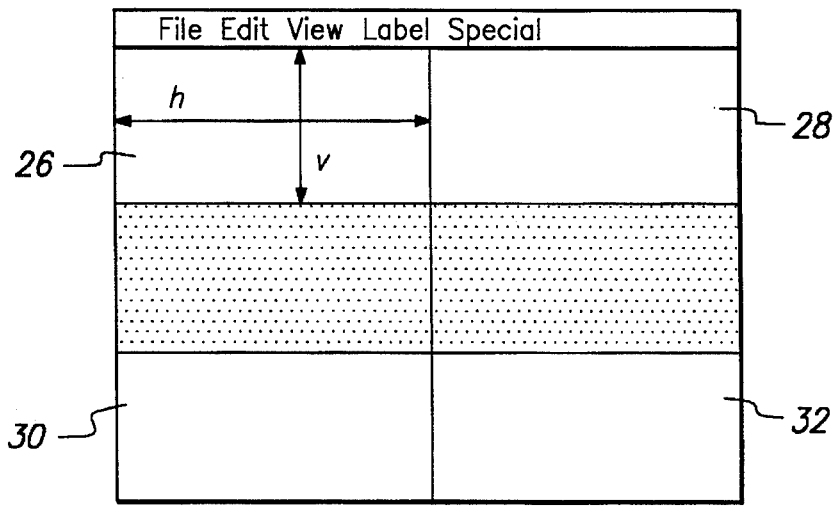
FIG. 4A
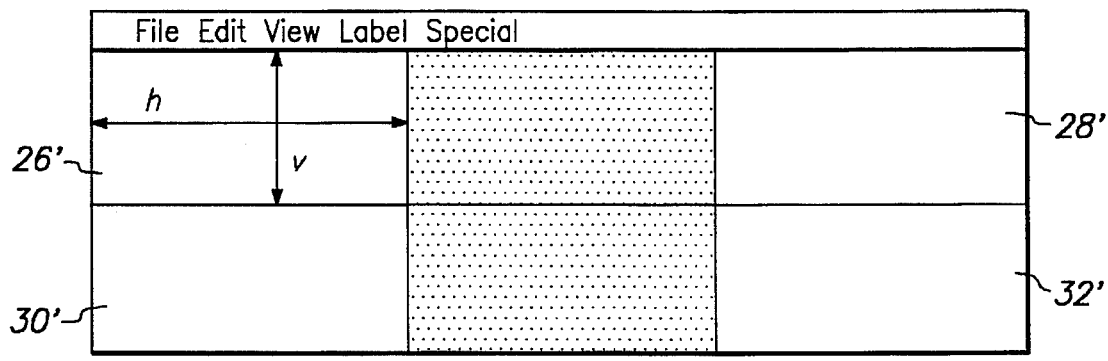
FIG. 4B
| CONFIGURATION 1 | | CONFIGURATION 2 | |
|---|---|---|---|
| ELEMENT | POSITION | ELEMENT | POSITION |
| DISK 1 | x1,y1 | DISK 1 | x6,y6 |
| FOLDER 1 | x2,y2 | DISK 2 | x7,y7 |
| FOLDER 2 | x3,y3 | FOLDER 1 | x8,y8 |
| FOLDER 3 | x4,y4 | FOLDER 2 | x9,y9 |
| TRASH | x5,y5 | TRASH | x10,y10 |
FIG. 5

SYSTEM FOR UPDATING THE LOCATIONS OF OBJECTS IN COMPUTER DISPLAYS UPON RECONFIGURATION

FIELD OF THE INVENTION

The present invention is directed to the display of information on one or more computer monitors, and more particularly to the updating of displayed information upon monitor reconfiguration.

BACKGROUND OF THE INVENTION

In the modern computing environment, the user is presented with a variety of choices for displaying information processed within the computer. Monitors and display screens come in a wide choice of sizes, and many offer different display modes with varying resolutions. If the user switches from one monitor to another, it may be necessary to update the displayed information to accommodate the size and/or characteristics of the new monitor. Similarly, for monitors that are capable of operating in multiple modes, an update may be required when switching from one mode to another. For example, in one mode the monitor may provide a display that is 640 pixels wide and 480 pixels high, and in another mode the width of the display might be 1,024 pixels and its height can be 768 pixels.

The configuration of the display system can also change as a result of other occurrences as well, for example when a graphics system implements a change in display resolution. Whenever a change in display configuration occurs, the elements of the display might be placed at different locations relative to the overall shape of the display. These changes are particularly noticeable in graphical interfaces which employ a desktop metaphor to identify objects and applications for the user. In graphical interfaces which employ this type of metaphor, files, application programs and other objects are represented as icons that can be placed on the desktop by the user. A typical user may prefer to group the icons on the desktop in a manner which identifies their relationship to one another. For example, utility applications may be placed in one corner of the desktop, files in another, and other application programs in a third area. If the display changes, the icons may appear in different portions of the overall display. For example, an icon located at the fight edge of a 640 pixel wide display screen would be positioned near the center of the screen if the display is switched to a width of 1,024 pixels. Conversely, an icon on the right edge of a display having a width of 1,024 pixels would be positioned off the display if the display is changed to the 640 pixel mode.

In the past, when the size of a display changed, icons that were positioned off the display would be relocated to default positions on the new display. For example, they might be located along the fight edge of the display, beginning at the top right corner. An alternative approach is to scale the position of each icon in proportion to its position on the previous display.

While both of these approaches attempt to ensure that all objects in the prior display are visible on the new display, they do not preserve the grouping or relative arrangement of the icons from the original display to the new display. For example, approaches which employ only proportional scaling cause the icons to overlap or move apart, depending on the size of the new display relative to the original display. With either of these prior approaches, the user is forced to rearrange the icons on the new display in accordance with preferred groupings and manner of presentation. It is desirable, therefore, to provide a system for updating a display in which user preferences are maintained, to the extent possible, when changing the size and/or configuration of the display.

BRIEF STATEMENT OF THE INVENTION

In accordance with the present invention, the foregoing objective is achieved by updating the display of information in a manner that preserves the relative positions of objects, such as icons, in the display. In one aspect of the invention, each of the original and new displays is divided into a number of sectors, e.g., four quadrants. Corresponding sectors in each of the original and new displays are of the same size. For example, the size of each sector can be determined by the smaller dimension for that sector in each of the original and new displays. Once the sectors have been determined, all objects located within a sector of the original display are placed in the same position in the corresponding sector of the new display. In this manner, the relative locations and distances between objects within each sector remain the same. If any objects are located outside of the sectors in the original display, their positions in the new display are determined through proportional scaling.

In accordance with a second feature of the invention, a database of user preferences is established for each different display configuration. Whenever a user places or repositions an object within a particular display, that position is stored in the database for that display. Subsequently, whenever that display mode is employed, the objects are positioned in accordance with the information stored in the database.

Preferably, both of these features are employed in combination to update the display. For example, when the display configuration is changed, a database for that configuration is first accessed, to identify user preferred positions for each of the objects. For any objects whose positions are not stored in the database, the sector approach is used to determine default positions for them.

The system of the present invention offers the advantage that, when a display is reconfigured, user preferences as to the location of objects within the display are preserved as much as possible. As a result, the user does not have to spend time relocating objects on the new display in order to obtain a preferred layout.

Further features and advantages of the present invention are explained in detail hereinafter with reference to preferred embodiments illustrated in the accompanying drawings.

BRIEF DESCRIPTION OF THE DRAWINGS

FIGS. 4A and 4B illustrate another example of change in display size, and the manner in which the present invention applies thereto; and FIG. 5 is an example of a database which can be employed to store user preferences for object locations.

DETAILED DESCRIPTION

To facilitate an understanding of the present invention, it is described hereinafter with reference to its implementation in a graphical user interface of the type which employs a desktop containing objects that are represented as icons. It will be appreciated that the practical applications of the invention are not limited to this particular embodiment. Rather, the invention can find utility in any situation in which it is desirable to update a display to accommodate a change in size and/or display mode.

Figure 1A:
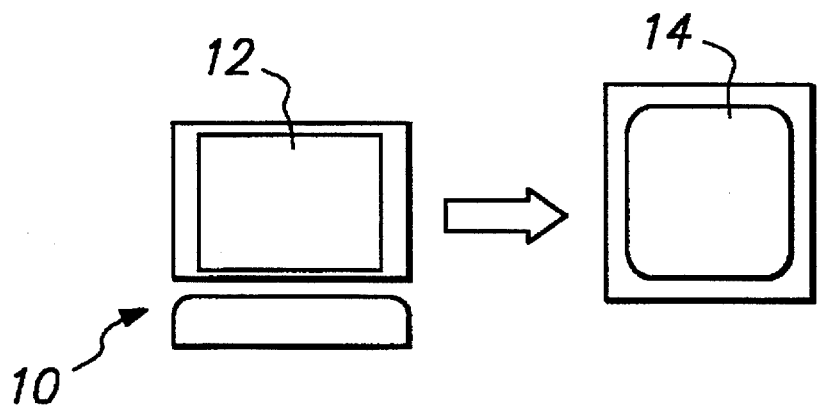
FIGS. 1A, 1B and 1C illustrate examples of situations in which monitor configurations change, necessitating a need to update the display.
Figure 1B:
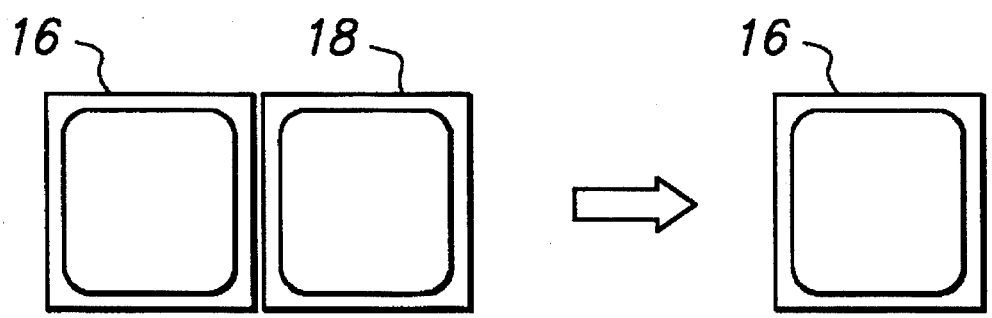
Figure 1C:
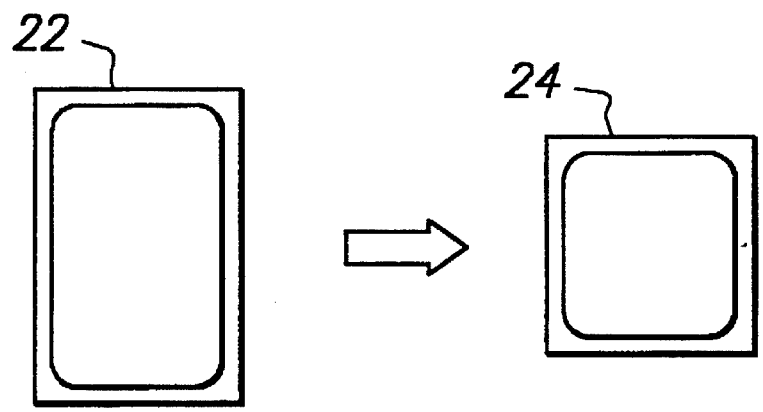

FIGS. 1A, 1B and 1C illustrate examples of situations in which a display is reconfigured. In the example of FIG. 1A, a user may employ a laptop or notebook computer 10, for example while travelling. The display screen 12 of the notebook computer is typically relatively small in size. Therefore, upon returning to the office, the user may desire to employ a monitor having a larger display area, such as a standard desktop monitor 14. For example, the notebook computer might be plugged into a docking station which is connected to a larger monitor. This change in monitors may necessitate an update of the arrangement of objects in the display.

In the example of FIG. 1B, a computer might be connected to dual monitors 16 and 18. In this situation, one-half of the overall display can appear on each monitor. Subsequently, one of the monitors may be removed, so that the size of the display is effectively cut in half. Again, the positions of the displayed objects will need to be rearranged, to accommodate those which were on the monitor 18 that was removed.

In the situation of FIG. 1C, the user may switch from a full page monitor 20 to a standard (half page) size monitor 22. Since the aspect ratio (height to width) of the display changes, the object positions will have to be updated In each of these situations, the actual size of the display changes. In other situations, the physical size of the display may remain the same, but its effective size may change, for example, in switching from a 640×480 display mode to a 1024×768 display mode. In each of these cases, it is desirable to reconfigure the elements appearing in the display, to make most effective use of the available display area. The present invention is directed to a system for updating the display in accordance with the available display area.

In accordance with one aspect of the present invention, a heuristic approach is employed in which the original and new display areas are divided into sectors, and the contents of each sector in the original display are directly transferred to a corresponding sector in the new display. This approach preserves the arrangement and relative spacings of the objects within each sector.

Figure 2A:
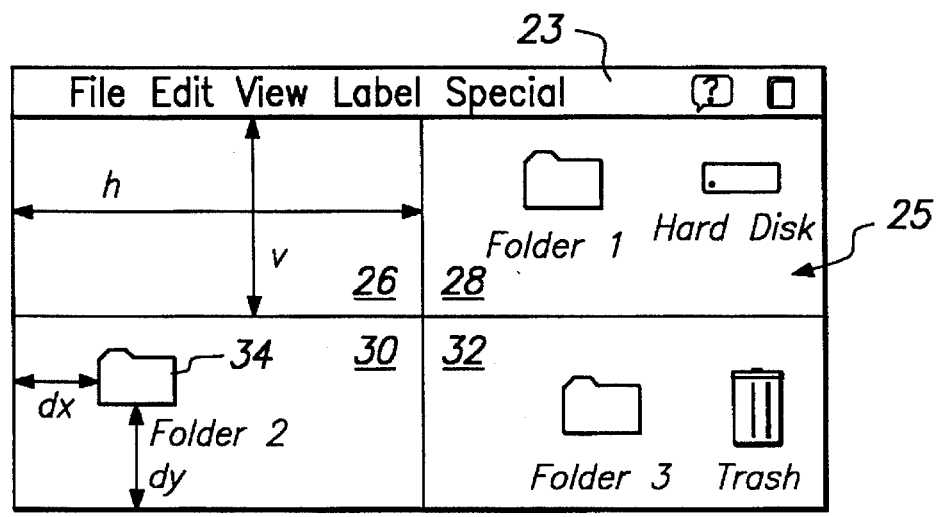
FIGS. 2A and 2B illustrate the manner in which the heuristic sector approach of the present invention is applied when going from a smaller display to a larger display.
Figure 2B:
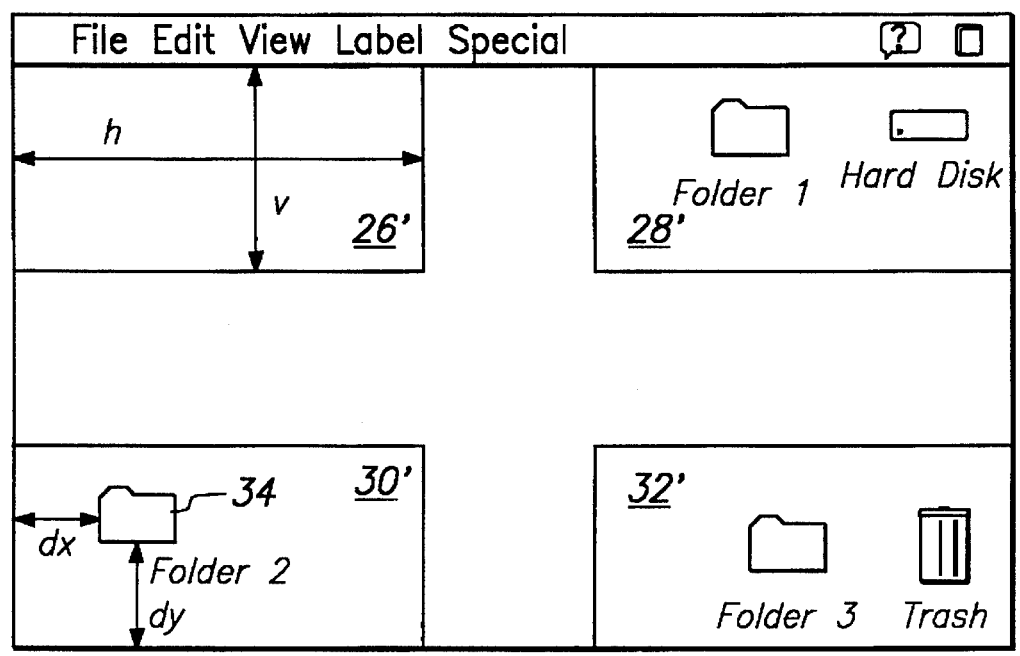

One technique for determining the sectors is illustrated in the example of FIGS. 2A and 2B. These figures illustrate a typical desktop that might be displayed on the monitor of a computer that employs a graphical user interface. The desktop includes a menu bar 23 at the top, and various icons within a workspace 25. In the particular example shown in FIGS. 2A and 2B, the contents of the original display, illustrated in FIG. 2A, are transferred to a new, larger display (FIG. 2B). To effect the transfer, corresponding areas in each of the original and new displays are established. The size of each area is determined by identifying the smaller width and height dimension for each of the two displays. In this particular example, both the width and height dimensions of the original display (FIG. 2A) are smaller than those of the new display (FIG. 2B). The original display is divided into four sectors 26, 28, 30 and 32, each of whose height and width dimensions, v and h, are equal to one-half of those for the overall display. In effect, therefore, the original display is divided into four quadrants.

Four sectors 26', 28', 30' and 32' of the same dimensions v and h are established at corresponding locations within the new, larger display of FIG. 2B. All of the icons within each sector in the original display are then mapped into the same location in the corresponding sector of the new display. For example, in the case of the sector 30 in the lower left corner of the display area, a folder 34 is located a distance dx from the left edge of the display and a distance dy from the bottom of the display. These same distances are used by the graphical user interface to position the folder relative to the left and bottom edges, respectively, of the new display in FIG. 2B.

It is possible, of course, to divide the display into sectors other than four quadrants, as shown in FIGS. 2A and 2B. It has been found, however, that most computer users tend to employ the corners of a display area as reference points for locating icons. For example, icons for application programs might be grouped in one corner of the display, those for file folders in another corner, and utility programs in another corner. Thus, by dividing the display into four quadrants, the relationship of the icons to the corners of the display is preserved.

Figure 3A:
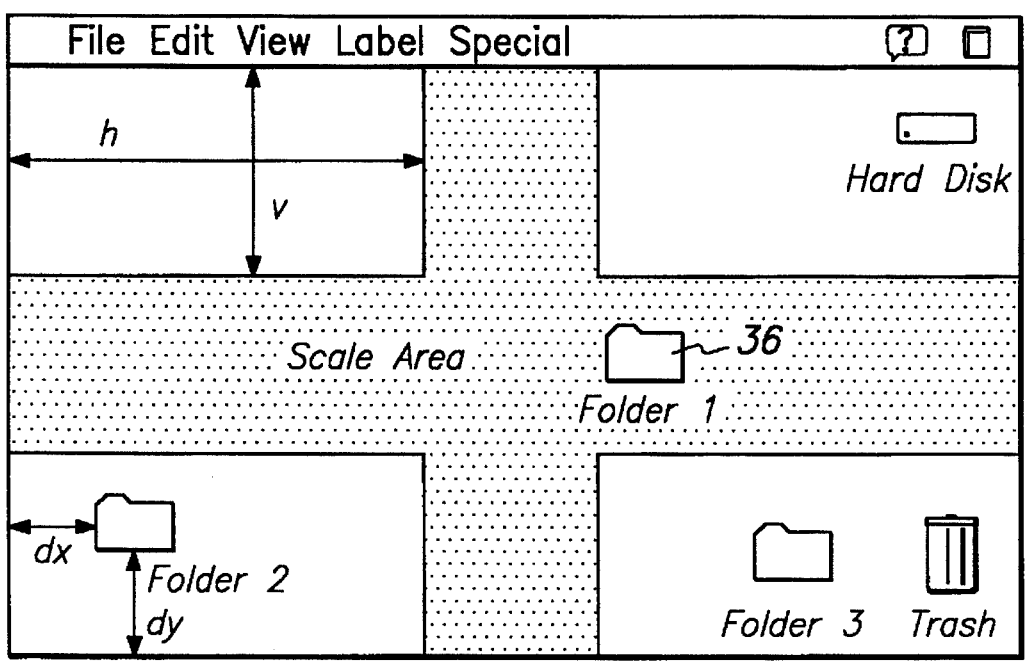
FIGS. 3A and 3B illustrate the operation of the present invention when going from a larger display to a smaller display.
Figure 3B:
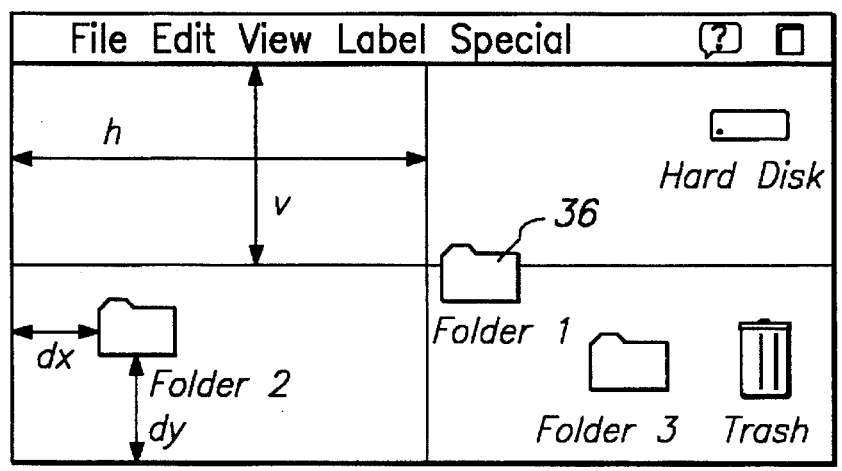

FIGS. 3A and 3B illustrate the converse situation, in which the original display is larger than the new display. In this case, since the dimensions of the new display are smaller than those of the original display, they are used to determine the size of the sectors. Once the size of the four sectors has been determined, they are respectively established in the four corners of the original display. As in the previous example, all items located within the sectors of the original display are mapped to the same locations in the corresponding sectors of the new display. Since the four sectors do not occupy the total area of the original display, it may be the case that certain objects are located outside of the sectors, as shown by the folder icon 36 in FIG. 3A. In this case, the position for this icon in the new display is determined through proportional scaling. In this manner, the position of the icon relative to the other icons is preserved, although the spacing between icons may vary.

As noted previously, the dimensions of the sectors are determined with reference to the smaller dimension of the two displays in each of the height and width directions. In the two preceding examples, both dimensions were determined with reference to a single display. In some situations, one dimension may be determined with reference to the original display and the other dimension with reference to the new display. Such a situation is illustrated in FIGS. 4A and 4B. In the example of these figures, the original display of FIG. 4A has a greater height than the new display of FIG. 4B, but a smaller width. In this case, the height v of the sectors is determined with reference to the smaller of the two height dimensions, i.e., that of the new display. Conversely, the width h of the sectors is equal to one-half the width of the original display, which is the smaller dimension.

In the foregoing examples, the sectors of the display are determined with reference to the display's dimensions. Alternative approaches for determining appropriate sectors can be employed as well. For example, rather than using the dimensions of the display, it is possible to employ the relative spacings, or density, of icons within the display as the determining factor. Any suitable approach for determining object density can be employed for this purpose. For example, the distances between pairs of adjacent icons can be measured, to calculate an average distance between icons.

Icons which are located closer to one another than this average distance, or some fraction thereof, can be identified as belonging to a group. If a different function is used to determine object density, all objects within a certain density factor can be labelled as part of the same group.

After all of the icons in a group have been identified, the portion of the display which contains this group can be established as one sector. The location of this sector in the overall display is then determined, for example with reference to one of the corners of the display, and a corresponding sector established in the new display at the same relative location. The icons are then mapped into the same positions in the established sector in the new display. With this approach, the user's preferred groupings of icons are maintained. Any icons which do not fall within an identified group can be positioned through proportional spacing.

It is possible to employ a combination of these two methods to establish the sectors as well. For example, the density of icons might first be analyzed to identify groups and established sectors pertaining thereto. The remainder of the display can then be divided into four quadrants to establish other sectors. With this approach, if the user groups icons in the center of the display, their relationship to one another will remain intact.

As a second feature of the present invention, a database is established for each different display configuration. Individual items of information in the database include an identification of each object in the display, and its position. Each time the user places a new object in the display, or repositions a desktop element, the user interface causes this new position to be stored in the database. An example of such a database is illustrated in FIG. 5. By storing user designated locations for each desktop element in each different display configuration, user preferences can be maintained from one display configuration to another.

Preferably, in the implementation of the present invention, both the database information and the sector positioning are employed to update a display upon change of configuration. When a new display configuration is employed, the user interface first refers to the database established for that configuration. All items from the original display that are identified within the database for the new display configuration are displayed at the positions stored therein. If an item's position has not been previously recorded for the new display configuration, e.g., an item recently added to the original display, its position is determined by the user interface using the heuristic approach. In the example of FIG. 5, Folder 3 is present in the original display (Configuration 1) but has no previously stored location for the new display (Configuration 2). Therefore, its position in the new display configuration is determined by means of the heuristic approach, and then stored in the database for future reference.

From the foregoing, it can be seen that the present invention provides a system for updating the location of elements in a reconfigured display, which preserves the original arrangement of elements as much as possible. With this system, the user is not required to spend time relocating elements to obtain a desired appearance.

It will be appreciated that the present invention is not limited to the specific embodiments which have been described herein to facilitate an understanding of its underlying principles. Rather, the implementation of the invention can take a number of different forms. The scope of the invention, therefore, is defined by the claims which are appended hereto, rather than the foregoing description, and all changes and equivalents which are consistent with the meaning of the claims are intended to be embraced therein.

What is claimed is:

1. In a computer having a visual display, a system for updating locations of displayed objects upon a change from a first display configuration to a second display configuration, comprising:

a database storing preferred locations for objects in said second display configuration, said database containing an identification of at least some of the objects to be displayed and a location for each object;

means for establishing corresponding sectors in each of the first and second display configurations; and a graphical interface for displaying the objects identified in said database on the display at the locations stored in the database, and for displaying other objects at locations within a sector of the first display configuration at the same locations within the corresponding sector of the second display configuration.

2. The system of claim 1 wherein corresponding sectors in the first display configuration and in the second display configuration have the same size.

3. The system of claim 2 wherein all sectors have the same size in both the first display configuration and the second display configuration.

4. The system of claim 2 wherein each sector has a height dimension and a width dimension, and wherein the height dimension of a sector is determined in accordance with the display configuration having the smaller height, and the width dimension of a sector is determined in accordance with the display configuration having the smaller width.

5. The system of claim 2 wherein a sector is established by determining the density of objects displayed within the first display configuration, grouping objects which fall within a predetermined density factor, and defining a sector around the grouped objects.

6. The system of claim 1 further including means for displaying objects which are not identified in said database and not located in any of the sectors of said first display configuration in a corresponding location in the second display configuration that is determined by proportionally scaling the position of the displayed object in accordance with the relative dimensions of the first and second display configurations.

7. The system of claim 1 wherein said objects include icons which represent files, software programs and/or hardware devices.

8. In a computer having a graphical user interface in which objects can be displayed at different locations, a method for updating the display of objects in response to a change from a first display configuration to a second display configuration, comprising the steps of:

establishing a plurality of display sectors for each of the first and second display configurations, where each display sector for the first configuration has a corresponding sector of the same size and relative location in the second configuration;

determining the locations of objects within each sector of the first display configuration; and displaying the objects at the same respective locations within the corresponding sector of the second display configuration.

9. The method of claim 8 further including the steps of:

detecting whether any objects are displayed outside of the established sectors in the first display configuration;

determining the location of each such detected object in the first display configuration; and displaying each such detected object at a corresponding location in the second display configuration.

10. The method of claim 9 wherein the corresponding location in the second display configuration is determined by proportionally scaling the position of the displayed object in accordance with the relative dimensions of the first and second display configurations.

11. The method of claim 8 wherein all of the sectors in both the first and second display configurations are of the same size.

12. The method of claim 11 wherein each sector has a height dimension and a width dimension, and wherein the height dimension of a sector is determined in accordance with the display configuration having the smaller height, and the width dimension of a sector is determined in accordance with the display configuration having the smaller width.

13. The method of claim 8 wherein the step of establishing said sectors comprises the steps of measuring the distances between adjacent displayed objects, grouping adjacent objects whose distance between one another is less than a threshold value, and defining a sector around each set of grouped objects.

14. The method of claim 8 wherein said objects include icons which represent files, software programs and/or hardware devices.

15. In a computer having a visual display, a method for updating locations of displayed objects upon a change from a first display configuration to a second display configuration, comprising the steps of:

storing preferred locations for objects in a database associated with said second display configuration, said database containing an identification of at least some of the objects to be displayed and a location for each object;

establishing corresponding sectors in each of the first and second display configurations; and displaying the objects identified in said database on the display at the locations stored in the database, and displaying other objects at locations within a sector of the first display configuration at the same locations within the corresponding sector of the second display configuration.

16. The method of claim 13 wherein corresponding sectors in the first display configuration and in the second display configuration have the same size.

17. The method of claim 16 wherein all sectors have the same size in both the first display configuration and the second display configuration.

18. The method of claim 16 wherein each sector has a height dimension and a width dimension, and wherein the height dimension of a sector is determined in accordance with the display configuration having the smaller height, and the width dimension of a sector is determined in accordance with the display configuration having the smaller width.

19. The method of claim 16 wherein the step of establishing a sector includes the steps of determining the density of objects displayed within the first display configuration, grouping objects which fall within a predetermined density factor, and defining a sector around the grouped objects.

20. The method of claim 15 further including the step of displaying objects which are not identified in said database and not located in any of the sectors of said first display configuration in a corresponding location in the second display configuration that is determined by proportionally scaling the position of the displayed object in accordance with the relative dimensions of the first and second display configurations.

21. The method of claim 15 wherein said objects include icons which represent files, software programs and/or hardware devices.

22. In a computer system of the type in which objects are displayed on a visual display and the display can be changed from one configuration to at least one other configuration, a method for maintaining user preferences regarding the display of objects in the respective configurations, comprising the steps of:

detecting when a user positions objects in the display while the display is in a first configuration;

storing the user-defined position of the objects in the display in a database associated with said first configuration;

detecting when a user positions objects in the display while the display is in a second configuration;

storing the user-defined position of the objects in the display in a database associated with said second configuration;

detecting a change of the configuration of the display from said first configuration to said second configuration; and repositioning objects in the display in accordance with their stored positions in said database associated with said second configuration.

23. The method of claim 22 including the further steps of detecting a change of the configuration of the display from said second configuration to said first configuration, and repositioning objects in the display in accordance with their stored positions in said database associated with said first configuration.

24. The method of claim 22 wherein said database associated with said first configuration and said database associated with said second configuration are both components of a single database.

25. The method of claim 22 wherein said objects include icons which represent files, software programs and/or hardware devices.

* * * * *